(12) United States Patent
Osawa

(10) Patent No.: US 12,313,915 B2
(45) Date of Patent: May 27, 2025

(54) EYEGLASS-SHAPED FRAME

(71) Applicant: CHARMANT INC., Sabae (JP)

(72) Inventor: Tomoharu Osawa, Sabae (JP)

(73) Assignee: CHARMANT INC., Sabae (JP)

( * ) Notice: Subject to any disclaimer, the term of this patent is extended or adjusted under 35 U.S.C. 154(b) by 0 days.

(21) Appl. No.: 18/854,063

(22) PCT Filed: Apr. 12, 2023

(86) PCT No.: PCT/JP2023/014937
§ 371 (c)(1),
(2) Date: Oct. 4, 2024

(87) PCT Pub. No.: WO2023/199958
PCT Pub. Date: Oct. 19, 2023

(65) Prior Publication Data
US 2025/0110348 A1     Apr. 3, 2025

(30) Foreign Application Priority Data
Apr. 15, 2022   (JP) ................................. 2022-067810

(51) Int. Cl.
*G02C 5/20*     (2006.01)
*G02C 5/16*     (2006.01)

(52) U.S. Cl.
CPC .................... *G02C 5/20* (2013.01); *G02C 5/16* (2013.01)

(58) Field of Classification Search
CPC .................... G02C 5/20; G02C 5/16
(Continued)

(56) References Cited

U.S. PATENT DOCUMENTS 11,372,262 B2 *   6/2022   Yang .................... G02C 5/2263
2006/0221299 A1 * 10/2006   Wang-Lee ........... G02C 5/2263
                                                              351/120
2016/0320632 A1   11/2016   Paulet Vazquez

FOREIGN PATENT DOCUMENTS

JP     H05-050420 U     7/1993
JP     H07-044367 U    11/1995
(Continued)

OTHER PUBLICATIONS

Notice of Reasons for Refusal for Japanese Application No. 2022-067810 mailed Apr. 8, 2024, 12pp.
(Continued)

*Primary Examiner* — Tuyen Tra
(74) *Attorney, Agent, or Firm* — HAUPTMAN HAM, LLP

(57) ABSTRACT

To provide an eyeglass-shaped frame that has both advantages of a temple with a rectangular cross section and advantages of a temple with a circular cross section. The eyeglass-shaped frame having a front part which holds lenses, a face shield, or the like, and temples which are attached to both ends of this front part and provided with an ear hook part, the eyeglass-shaped frame being configured such that: the eyeglass-shaped frame has a first elastic part arranged on a side near the front part F and a second elastic part arranged between the first elastic part and the ear hook part M; the first elastic part permits elastic deformation in a first direction and restricts elastic deformation in a direction different from the first direction; and the second elastic part permits elastic deformation in a second direction intersecting the first direction and restricts elastic deformation in a direction different from the second direction.

5 Claims, 4 Drawing Sheets

(58) Field of Classification Search
USPC .......................... 351/41, 111, 113, 114, 118
See application file for complete search history.

(56) References Cited

FOREIGN PATENT DOCUMENTS

| | | |
|---|---|---|
| JP | H11-337881 A | 12/1999 |
| JP | 2001-021845 A | 1/2001 |
| JP | 2002-139706 A | 5/2002 |
| JP | 2002-182165 A | 6/2002 |
| JP | 2004-037654 A | 2/2004 |
| JP | 2004-093741 A | 3/2004 |
| JP | 2013-068713 A | 4/2013 |
| JP | 2014-038292 A | 2/2014 |
| JP | 2017-049477 A | 3/2017 |
| JP | 2020-008654 A | 1/2020 |

OTHER PUBLICATIONS

PCT/ISA/210, "International Search Report for International Application No. PCT/JP2023/014937," Jun. 27, 2023, 4pp.
PCT/ISA/237, "Written Opinion of the International Searching Authority for International Application No. PCT/JP2023/014937," Jun. 27, 2023, 5pp.

* cited by examiner

EYEGLASS-SHAPED FRAME

RELATED APPLICATIONS

The present application is a National Phase of International Application Number PCT/JP2023/014937 filed Apr. 12, 2023, and claims priority to Japanese Application Number 2022-067810 filed Apr. 15, 2022.

TECHNICAL FIELD

The present invention relates to an eyeglass-shaped frame which holds as lenses, a face shield, as well as functional members of wearable devices or the like including a light, a camera, and a small display.

BACKGROUND ART

An eyeglass-shaped frame is configured to be stably held at four points by placing left and right nose pads attached to a front part on both sides of the nose, and placing left and right temples with ends curved into a dogleg shape above the left and right ears. An eyeglass-shaped frame in which the nose pads are no longer necessary because pads abut onto temples of a wearer is also configured to be stably held at four points by the left and right pads and the left and right temples. The temples formed of elastic materials such as β-titanium and stainless steel utilize their elasticity to sandwich the head of a wearer from both the left and right sides, so that the front part is prevented from being easily displaced from the face of the wearer even if the wearer looks down, moves his or her head, or exercises.

The cross-sectional shapes of the temple are various. A temple with a rectangular cross section can concentrate their elastic force in one direction so as to strongly pinch the head of a wearer from both the left and right sides, making it possible to prevent the front part from being easily displaced from the face of the wearer. However, when putting on and taking off the eyeglass-shaped frame, the curved ear hook parts slide and are pushed up along the ears of the wearer, which puts a large load on the ears of the wearer, causing problems such as discomfort and pain. In addition, since the front part is subjected to substantial torsional force, the eyeglass-shaped frame becomes distorted if it is repeatedly put on and taken off, making it impossible to be stably held at four points. The above are the drawbacks of the temple with a rectangular cross section. Furthermore, when wearing the eyeglass-shaped frame, if external force such as a shock is applied to the eyeglass-shaped frame due to exercise or the like, the temple may be pressed against the base of the ears and cause pain at the base of the ears, or repeated shocks may cause the temple and the base of the ears to rub against each other, causing damage to the base of the ears.

On the other hand, a temple with a circular cross section can be elastically deformed in all directions. Therefore, they have an advantage that they can bend easily when putting on and taking off eyeglass-shaped frame, making it easy to put on and take off and reducing the torsional force applied to the front part. However, they have a drawback that their elastic force is dispersed so that they cannot strongly pinch the head of the wearer from both the left and right sides, and thus the front part is easily displaced from the face of the wearer.

Temples of an eyeglass frame described in Patent Literature 1 are configured to be able to be bent or pushed open diagonally upward and outward. This configuration eliminates the aforementioned drawback of the temple with a circular cross section, namely the drawback that they can be bent all directions and thus the eyeglass-shaped frame can be easily displaced. In addition, even if the temple has a vertically long rectangular cross section, the temple is bent diagonally upward when taking off the eyeglasses, making it easier to take off the eyeglasses (see, for example, the description in paragraphs 0006, 0007, and 0019 of the specification).

CITATION LIST

Patent Literature

Patent Literature 1 Japanese Unexamined Patent Application Publication No. 2002-182165 (see the description in paragraphs 0006, 0007, and 0019 of the specification)

SUMMARY OF INVENTION

Technical Problem

However, in the temple of eyeglasses described in Patent Literature 1, the force for pinching the head of the wearer from left and right is dispersed diagonally upward, so that the front part is easily displaced from the face of the wearer. Furthermore, since the elastic force acts in only one direction, i.e., diagonally upward, the temple cannot be flexibly deformed to conform to complex head shapes, and the torsional force applied to the front part is still large. Therefore, Patent Literature 1 is still insufficient to solve the problem that the eyeglass-shaped frame is easily distorted by repeatedly putting on and taking off it.

The present invention has been made in view of the above problems and aims to provide an eyeglass-shaped frame that has both the advantages of the temple with a rectangular cross section and the advantages of the temple with a circular cross section, so that it can solve the problems that the eyeglasses described in Patent Literature 1 cannot address, and can reduce the load applied to the ears when putting on and taking off the eyeglass-shaped frame or when subjected to a shock.

Solution to Problem

In order to solve the aforementioned problems, in a first aspect of the invention, the eyeglass-shaped frame according to the present invention has a front part and temples attached to both ends of this front part and provided with an ear hook part, and is configured such that: the eyeglass-shaped frame has a first elastic part arranged on a side near the front part and a second elastic part arranged between the first elastic part and the ear hook part; the first elastic part permits elastic deformation in a first direction and restricts elastic deformation in a direction different from the first direction; the second elastic part permits elastic deformation in a second direction intersecting the first direction and restricts elastic deformation in a direction different from the second direction; the first direction is a lateral direction in which a head of a wearer of the eyeglass-shaped frame is pinched; the second direction is a vertical direction orthogonal to the lateral direction; if force in the vertical direction is not applied when wearing the eyeglass-shaped frame, the second elastic part is not elastically deformed in the vertical direction; when putting on and taking off the eyeglass-shaped frame, the first elastic part and the second elastic part are elastically deformed along the head by a combination of bending in two directions, respectively; and the first elastic part and the second elastic part have elastic force that makes it possible by a combination of the elastic deformations in two directions to restrict distortion of the front part caused by force applied to the eyeglass-shaped frame when putting on, taking off, and wearing the eyeglass-shaped frame and to reduce a load applied to ears of the wearer and pain in the ears of the wearer.

As described in a second aspect, the first elastic part may permit elastic deformation in the vertical direction, and the second elastic part may permit elastic deformation in the lateral direction.

The first elastic part may be provided on end pieces of the front part. However, in a third aspect, both the first elastic part and the second elastic part may be provided on the temple.

This configuration makes it possible, for example, to strongly pinching the head of the wearer from both the left and right sides by concentrating the elastic force of the first elastic part in one direction, and to prevent a large load from being applied to the ears of the wearer when wearing the eyeglass-shaped frame by bending the temple in the second elastic part. Furthermore, by combining the first elastic part and the second elastic part, the torsional force applied to the front part can be alleviated.

It is preferable in the present invention that, the elastic force of the first elastic part and the second elastic part do not inhibit the function of the other elastic part. For example, if the first elastic part strongly pinches the head of the wearer from both the left and right sides so as not to displace the eyeglass-shaped frame, the second elastic part has elastic force that does not cause the eyeglass-shaped frame to be displaced when, for example, a shock is subjected to the eyeglass-shaped frame.

Note that the shape of the head as well as the position and height of the ears vary depending on the wearer, the optimal directions of the first direction of the first elastic part and the second direction of the second elastic part will differ depending on the wearer. Here, by arranging the first elastic part and the second elastic part such that a relative angle between the first direction and the second direction is variable, the first direction and the second direction can be set depending on the wearer.

Materials and forms of the first elastic part and the second elastic part are not particularly limited as long as they can exhibit the effects of the present invention. In a fourth aspect, at least one of the first elastic part and the second elastic part may be formed from a leaf spring. Alternatively, in a fifth aspect, at least one of the first elastic part and the second elastic part may be formed from a plurality of rod-shaped members. In the latter case, in a sixth aspect, the plurality of rod-shaped members may be twisted at a middle part, the first elastic part may be arranged on a side where the front part is located when viewed from the middle part, and the second elastic part may be arranged on a side where the ear hook part is located when viewed from the middle part. The rod-shaped member may have a circular cross section, an elliptical cross section, a rectangular cross section, or a polygonal cross section.

Advantageous Effects of Invention

The eyeglass-shaped frame according to the present invention can be elastically deformed along the shape of the head due to combination of biaxial elastic deformation of the first elastic part and the second elastic part, thereby making it easier to put on and take off the eyeglass-shaped frame, and to reduce bending force transmitted to the front part to suppress distortion of the front part. In addition, if an external shock is applied to the eyeglass-shaped frame due to exercise or the like, the first elastic part and the second elastic part can absorb this shock so as to reduce the load applied to the ears and pain in the ears.

As described above, the present invention has both the advantages of the temple with a rectangular cross section and the advantages of the temple with a circular cross section and can solve both the drawbacks of the temple with a rectangular cross section and the drawbacks of the temple with a circular cross section.

BRIEF DESCRIPTION OF DRAWINGS

FIG. 1 relates to a first embodiment of the eyeglass-shaped frame according to the present invention, in which

FIG. 2 is related to a second embodiment of the eyeglass-shaped frame according to the present invention.

FIG. 3 is related to a third embodiment of the eyeglass-shaped frame according to the present invention.

FIG. 4 is related to a variation of the eyeglass-shaped frame according to the third embodiment.

DESCRIPTION OF EMBODIMENTS

Preferred embodiments of the eyeglass-shaped frame according to the present invention will be described in detail with reference to the drawings.

First Embodiment

Figure 1A:
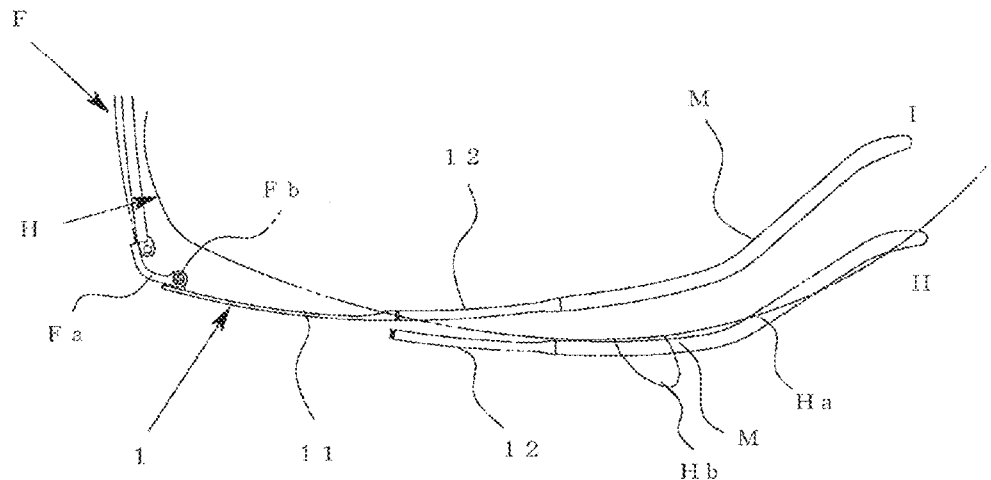
FIG. 1(a) is a plan view of one of the left and right temples.
Figure 1B:
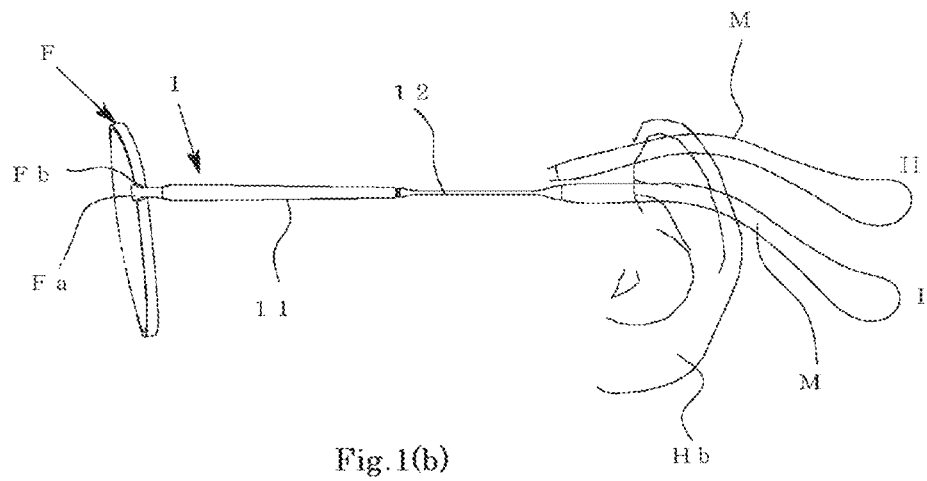
FIG. 1(b) is a side view of FIG. 1(a).

FIG. 1 relates to a first embodiment of the eyeglass-shaped frame according to the present invention, in which FIG. 1(a) is a plan view of one of the left and right temples, and FIG. 1(b) is a side view of FIG. 1(a).

Hereinafter, the eyeglass-shaped frame is described as an eyeglass frame including a front part F that holds lenses. One end of each of the left and right temples 1 is connected to the front part F via a hinge Fb on an end piece Fa, so that the left and right temples 1 are foldable relative to the front part F. The other ends of the left and right temples 1 are formed as ear hook parts M, which are curved to hang along the ears Hb of the wearer.

The temple 1 between the hinge Fb and the ear Hb has a first elastic part 11 formed on a side where one end (the hinge Fb) is located and a second elastic part 12 formed on a side where the other end is located.

One end of the first elastic part 11 and the end piece Fa, the other end of the first elastic part 11 and one end of the second elastic part 12, as well as the other end of the second elastic part 12 and one end of the ear hook part M can be connected to each other, respectively, by brazing, laser welding, screws, or the like. In addition, the first elastic part 11 and the second elastic part 12 may be formed in one piece by pressing, cutting, or the like.

In this embodiment, the first elastic part 11 and the second elastic part 12 are formed by a leaf spring which has a substantially rectangular cross section and is made of β-titanium, stainless steel, spring steel, or the like and has elasticity. When applying bending force to both ends of the first elastic part 11 and the second elastic part 12 formed by the leaf spring, they are bent in a direction such that their flat front or back surface forms an inward curve, but they are not bent in any other directions.

The first elastic part 11 is arranged on the side where the one end (the hinge Fb) of the temple 1 is located such that flat surfaces of the leaf spring faces in a direction intersecting a plane facing a temporal region Ha of the wearer (hereinafter, this direction is referred to as a "first direction"), and the second elastic part 12 is arranged between the first elastic part 11 and the ear hook part M such that its flat front and back surfaces face in a direction intersecting the direction of the flat front and back surfaces of the first elastic part 11 (hereinafter, referred to as a "second direction"). Note that, in this embodiment, the intersecting angle between the first direction and the second direction is a substantially right angle.

With the above-described arrangement of the first elastic part 11 and the second elastic part 12, when the wearer puts the eyeglass-shaped frame on the head H, the ear hook part M is pushed outwards along the temporal region Ha, and bending force generated at this time bends the first elastic part 11 in the first direction. On the other hand, bending of the second elastic part 12 in a direction other than the second direction is restricted. Due to the bending of the first elastic part 11 in the first direction, the temples 1 expand outwards as indicated by symbols I and II in FIG. 1(*a*), so that the eyeglass-shaped frame can accommodate various head widths depending on the wearer. In addition, the left and right temples 1 expanding outwards pinch the head H of the wearer in order to suppress displacement of the eyeglass-shaped frame.

When putting on and taking off the eyeglass-shaped frame, the curved ear hook part M is moved along the ear Hb so that the ear hook part M is pushed upwards by the ear Hb. Bending force generated at this time bends the second elastic part 12 and moves the ear hook part M upwards (see the positions I and II in FIG. 1(*b*)). On the other hand, bending of the first elastic part 11 in a direction other than the first direction is restricted. This can reduce a load applied to the ears Hb and pain in the ears Hb.

In the eyeglass-shaped frame according to the present invention, since the first elastic part 11 and the second elastic part 12 independently bends in different directions, elastic deformation along the shape of the head can be achieved as not only uniaxial elastic deformation but also combination of biaxial elastic deformation, thereby making it easier to put on and take off the eyeglass-shaped frame, and to reduce bending force transmitted to the front part F to suppress distortion of the front part F. In addition, if an external shock is applied to the eyeglass-shaped frame due to exercise or the like, the first elastic part 11 and the second elastic part 12 can absorb this shock so as to reduce the load applied to the ears Hb via the ear hook parts M and pain in the ears Hb.

Second Embodiment

Figure 2A:
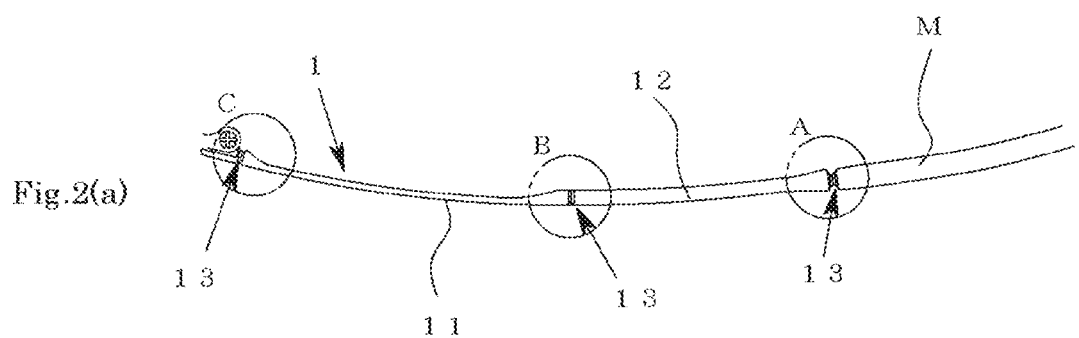
FIG. 2(a) is a partial plan view of a main part of the temple.
Figure 2B:
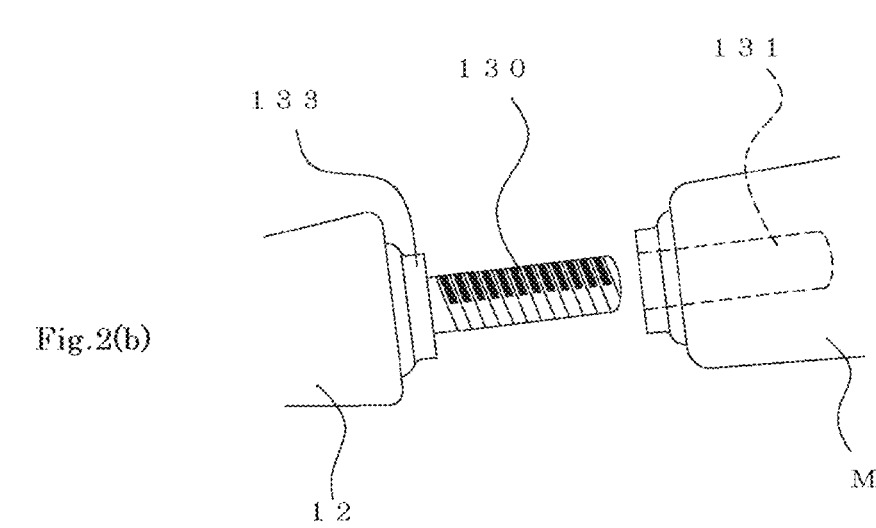
FIGS. 2(b) and 2(c) are partial enlarged views of a part A, which is one of connecting parts in a state (b) before connection and (c) after connection.
Figure 2C:
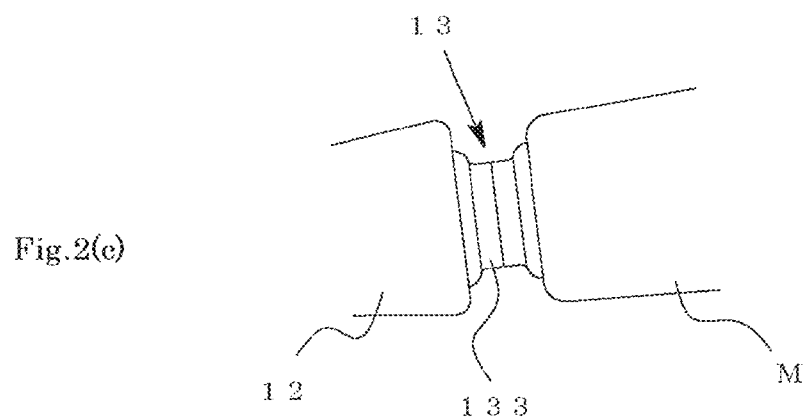

FIG. 2 is related to a second embodiment of the eyeglass-shaped frame according to the present invention. FIG. 2(*a*) is a partial plan view of a main part of the temple, and FIGS. 2(*b*) and 2(*c*) are partial enlarged views of a part A, which is one of connecting parts, in a state (b) before connection and (c) after connection.

In this embodiment, one end of the first elastic part 11 and the end piece Fa, the other end of the first elastic part 11 and one end of the second elastic part 12, as well as the other end of the second elastic part 12 and one end of the ear hook part M are connected via connecting parts 13 consisting of a threaded shaft 130 and a threaded hole 131.

In FIG. 2(*a*), the connecting part 13 in a portion indicated by a symbol A has the threaded shaft 130 which is formed on the other end of the second elastic part 12 and the threaded hole 131 which is formed on the other end of the ear hook part M and into which the threaded shaft 130 can be screwed.

The size of the attachment angle of the second elastic part 12 with respect to the ear hook part M (orientation of the second direction) can be adjusted by adjusting the screwing length of the threaded shaft 130 into the threaded hole 131. Although the screwing length can be adjusted by changing the shaft length of the threaded shaft 130, as in the example shown, the screwing length can also be easily and freely adjusted by changing the thickness or number of the detachable washers 133 on the threaded shaft 130. The connecting parts 13 in portions indicated by symbols B and C can be similarly configured, so that the intersecting angle between the first direction and the second direction can be adjusted to an optimal angle depending on the individual wearers of the eyeglass-shaped frame by adjusting the screwing length of the threaded shaft 130 in each portion A, B, and C.

Third Embodiment

Figure 3A:
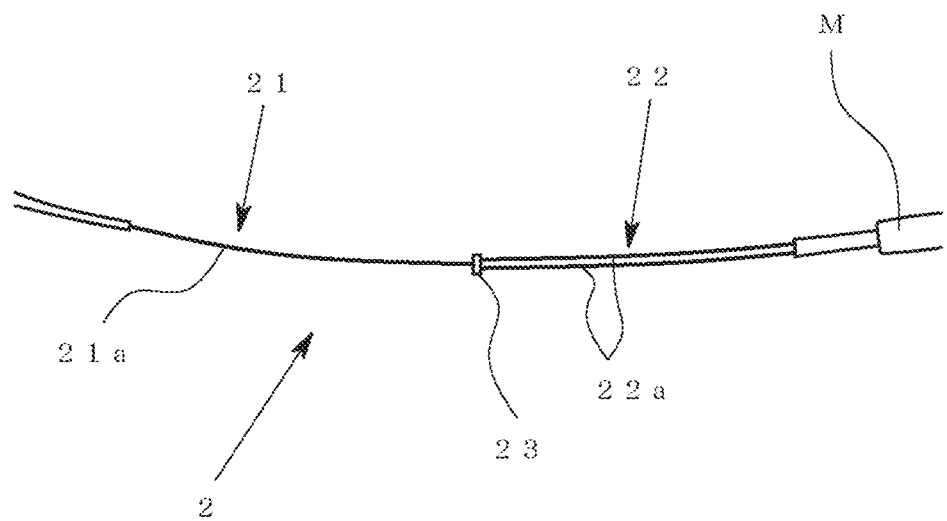
FIG. 3(a) is a partial plan view of a main part of the temple.
Figure 3B:
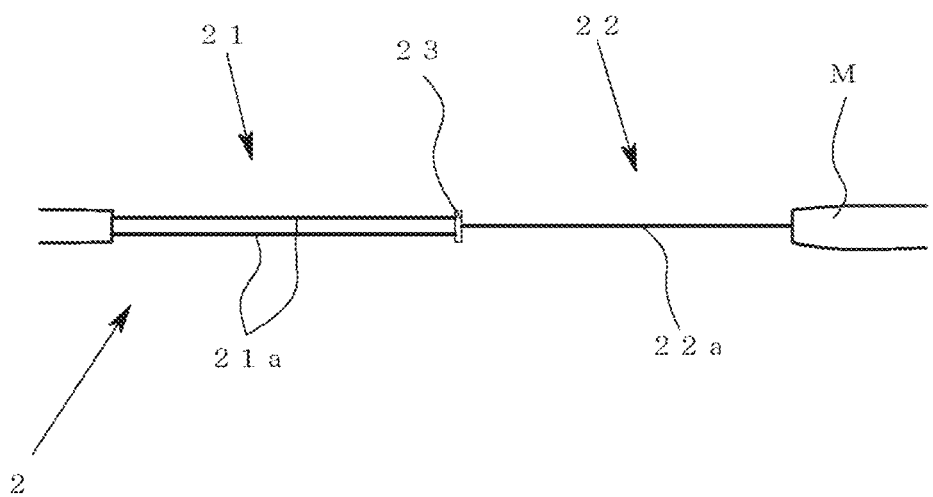
FIG. 3(b) is a side view thereof.

FIG. 3 is related to a third embodiment of the eyeglass-shaped frame according to the present invention. FIG. 3(*a*) is a partial plan view of a main part of the temple, and FIG. 3(*b*) is a side view thereof.

The temple 2 of the eyeglass-shaped frame according to this embodiment has a first elastic part 21 and a second elastic part 22 formed by a plurality of elastic rod-shaped members 21*a* and 22*a* instead of the leaf-spring-shaped first elastic part 11 and second elastic part 12 of the temple 1 according to the preceding embodiment.

Similarly to the preceding embodiment, one end of the first elastic part 21 is connected to the end piece Fa (see FIG. 1), and the other end of the second elastic part 22 is connected to one end of the ear hook part M. The other end of the first elastic part 21 and one end of the second elastic part 22 are connected via a plate-shaped or block-shaped connecting part 23.

Note that each of the connecting parts 23 on the end piece Fa side and the ear hook part M side may have the same construction as the connecting parts 13 according to the second embodiment shown in FIG. 2.

In the first elastic part 21, multiple (two in the example shown) rod-shaped members 21*a* are arranged in a plane facing in the first direction, and in second elastic part 22, multiple (two in the example shown) rod-shaped members 22*a* are arranged in a plane facing in the second direction.

Similarly to the leaf-spring-shaped first elastic part 11 and second elastic part 12 according to the preceding embodiment, by arranging the rod-shaped member 21*a* and 22*a* as described above, the plurality of rod-shaped members 21*a* in the first elastic part 21 is elastically bent only in a direction such that a front or back surface of the plane in which they are arranged forms an inward curve (first direction), and the plurality of rod-shaped members 22*a* in the second elastic part 22 is elastically bent only in a direction such that a front or back surface of the plane in which they are arranged forms an inward curve (second direction). They are never bent in any other directions.

Variation of Third Embodiment

Figure 4A:
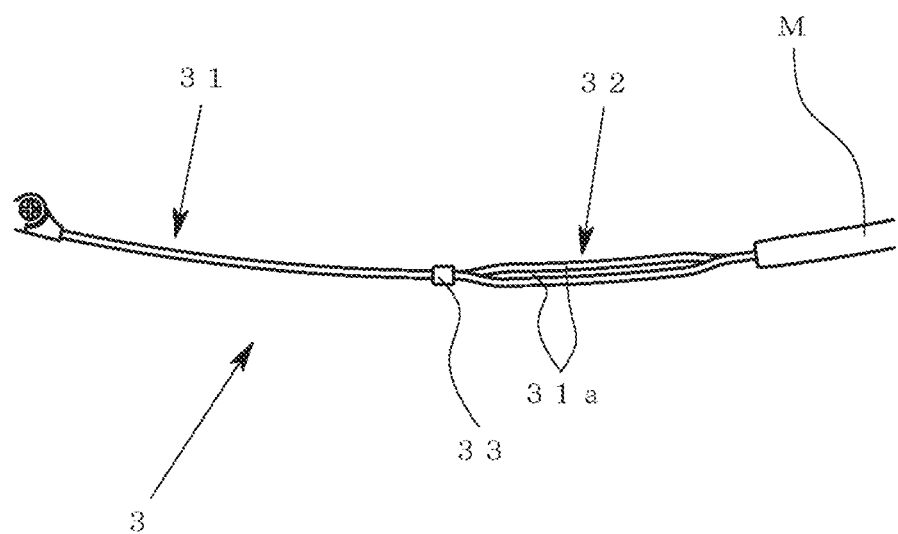
FIG. 4(a) is a partial plan view of a main part of the temple.
Figure 4B:
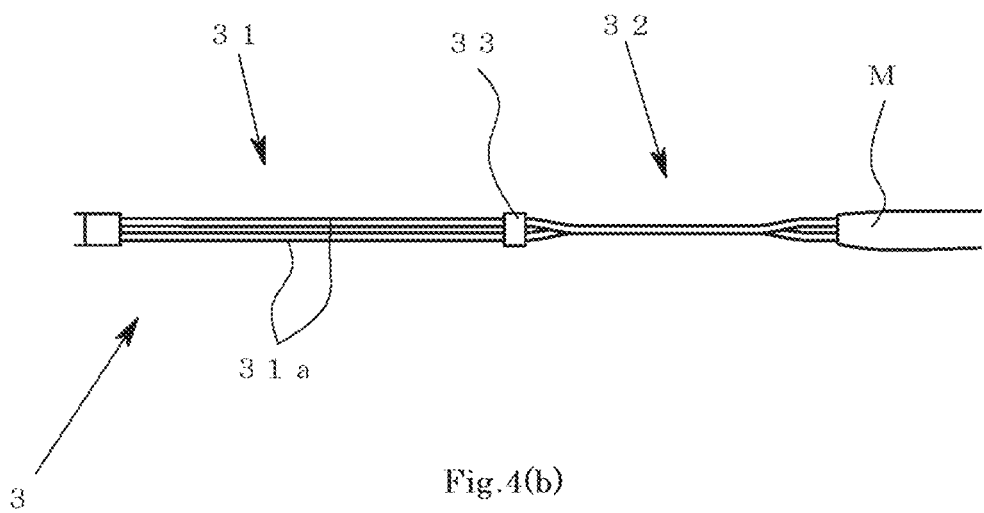
FIG. 4(b) is a side view thereof.

FIG. 4 is related to a variation of the third embodiment. FIG. 4(a) is a partial plan view of a main part of the temple, and FIG. 4(b) is a side view thereof.

Similarly to the temple 2 according to the third embodiment, the first elastic part 31 and the second elastic part 32 in the temple 3 according to this embodiment are formed by rod-shaped members. The difference between the temple 3 and the temple 2 according to the third embodiment is that the rod-shaped member of the temple 3 is a single rod-shaped member 31a which is continuous from the first elastic part 31 to the second elastic part 32. The first elastic part 31 and the second elastic part 32 are formed by arranging multiple (two in the example shown) of rod-shaped members 31a in parallel.

In the first elastic part 31, front parts of multiple rod-shaped members 31a are arranged in a plane facing in the first direction, and in second elastic part 32, rear parts of the multiple rod-shaped members 31a are arranged in a plane facing in the second direction.

A plate-shaped or block shaped intermediate member 33 is provided between the first elastic part 31 and the second elastic part 32, and the plurality of rod-shaped members 31a is inserted through the through holes (not shown) formed in this intermediate member 33. Then, the plurality of rod-shaped members 31a is twisted at a rear part that has passed through the intermediate member 33 for changing direction from the first direction to the second direction.

By arranging the rod-shaped members 31a as described above, the first elastic part 31 and the second elastic part 32 according to this variation also operate in the same manner as the first elastic part 21 and second elastic part 22 according to the third embodiment. That is, the plurality of rod-shaped members 31a in the first elastic part 31 is elastically bent only in a direction such that a front or back surface of the plane in which they are arranged forms an inward curve (first direction), and the plurality of rod-shaped members 31a in the second elastic part 32 is elastically bent only in a direction such that a front or back surface of the plane in which they are arranged forms an inward curve (second direction). They are never bent in any other directions.

Similarly to the temple 1 according to the first embodiment, in the temples 2 and 3 according to the third embodiment and the variation thereof, respectively, when the wearer puts the eyeglass-shaped frame on the head H, the ear hook part M is pushed outwards along the temporal region Ha, and bending force generated at this time bends the first elastic part 21 or 31 in the first direction. On the other hand, bending of the second elastic part 22 or 32 in a direction other than the second direction is restricted. Due to the bending of the first elastic part 21 or 31 in the first direction, the temples 2 or 3 expand outwards so that the eyeglass-shaped frame can accommodate various head widths depending on the wearer. In addition, the left and right temples 2 or 3 expanding outwards pinch the head H of the wearer in order to suppress displacement of the eyeglass-shaped frame.

When putting on and taking off the eyeglass-shaped frame, the curved ear hook part M is moved along the ear Hb so that the ear hook part M is pushed upwards by the ear Hb. Bending force generated at this time bends the second elastic part 22 or 32 and moves the ear hook part M upwards. On the other hand, bending of the first elastic part 21 or 31 in a direction other than the first direction is restricted. This can reduce a load applied to the ears Hb and pain in the ears Hb.

The preferable embodiments of the present invention have been described above, but the present invention is not limited by the description above.

For example, the first elastic parts 11, 21, and 31 and the second elastic parts 12, 22, and 32 have been described in the above as being made of metal such as β-titanium, stainless steel or spring steel. However, they may be made of other metals as long as they have spring properties (elasticity) or be made of resins having spring properties such as polyamide.

In addition, the first elastic part 11 and the second elastic part 12 according to the first embodiment have been described as a flat leaf spring having a substantially rectangular shape in a plan view. However, as long as the effect of them are not changed, they may have an elliptical shape, a cloud shape, or other shapes in a plan view, or they may be a wave-shaped leaf spring or a leaf spring partially or entirely curved in one direction. Furthermore, in the third embodiment and the variation thereof, it has been described that the rod-shaped members 21a and 22a, or the rod-shaped members 31a are arranged in the same plane, respectively. However, if the number of the rod-shaped members 21a, 22a, or 31a are three or more, it is not necessary that all of them are arranged in the same plane as long as the bending direction of the first elastic part 21 or 31 and the second elastic part 22 or 32 can be oriented to the first direction and the second direction, respectively.

Furthermore, in the above description, the first elastic parts 11, 21, and 31 face in the first direction, and the second elastic parts 12, 22, and 32 face in the second direction intersecting the first direction. However, the first elastic parts 11, 21, and 31 may face the second direction, and the second elastic part 12, 22, and 32 face in the first direction intersecting the second direction. As a result, the first elastic part 11, 21, and 31, which are elastically deformed in a vertical direction, can be placed farther from the ear Hb than the temples 1, 2, and 3 according to the above-described embodiments, so that a load applied to the ear Hb and pain in the ear Hb can be further reduced even if a shock is applied to the eyeglass-shaped frame due to exercise or the like.

In addition, in the above description, the first elastic part and the second elastic part are provided on the temple. However, it is not necessary to provide both the first elastic part and the second elastic part on the temple. For example, the first elastic part may be provided on the end piece Fa of the front part F, and the second elastic part may be provided on the temple. In this case, the hinge Fb of the end piece Fa may be a spring hinge, and this spring hinge may be used as the first elastic part.

Furthermore, in the present invention, the first elastic part 11 according to the first embodiment, the first elastic part 21 according to the third embodiment, or the first elastic part 31 according to the variation of the third embodiment may be appropriately combined with the second elastic part 12 according to the first embodiment, the second elastic part 22 according to the third embodiment, or the second elastic part 32 according to the variation of the third embodiment.

INDUSTRIAL APPLICABILITY

The eyeglass-shaped frame according to the present invention can be applied not only to an eyeglass-shaped frame which holds lenses or a face shield on its front part, but also to an eyeglass-shaped frame which holds functional members of wearable devices or the like including a light, a camera, and a small display as representative examples.

REFERENCE NUMERALS 1, 2, 3 Temple
11, 21, 31 First Elastic part
21a, 31a Rod-Shaped Member
12, 22, 32 Second Elastic part
22a Rod-Shaped Member
13, 23 Connecting Part
33 Intermediate Member
130 Threaded Shaft
131 Threaded Hole
133 Washer
F Front part
Fa End Piece
Fb Hinge
M Ear hook part
H Head
Ha Temporal Region
Hb Ear

The invention claimed is:

1. An eyeglass-shaped frame comprising a front part and temples attached to both ends of the front part and provided with an ear hook part, characterized in that:
the eyeglass-shaped frame has a first elastic part arranged on a side near the front part and a second elastic part arranged between the first elastic part and the ear hook part;
the first elastic part permits elastic deformation in a first direction and restricts elastic deformation in a direction different from the first direction;
the second elastic part permits elastic deformation in a second direction intersecting to the first direction and restricts elastic deformation in a direction different from the second direction;
the first direction is a lateral direction in which a head of a wearer of the eyeglass-shaped frame is pinched, and the second direction is a vertical direction orthogonal to the lateral direction;
if force in the vertical direction is not applied when wearing the eyeglass-shaped frame, the second elastic part is not elastically deformed in the vertical direction;
when putting on and taking off the eyeglass-shaped frame, the first elastic part and the second elastic part are elastically deformed along the head by a combination of bending in two directions, respectively; and
the first elastic part and the second elastic part have elastic force that makes it possible by a combination of the elastic deformations in two directions to restrict distortion of the front part caused by force applied to the eyeglass-shaped frame when putting on, taking off, and wearing the eyeglass-shaped frame and to reduce a load applied to ears of the wearer and pain in the ears of the wearer.

2. The eyeglass-shaped frame according to claim 1, characterized in that the first elastic part and the second elastic part are provided on the temple.

3. The eyeglass-shaped frame according to claim 1, characterized in that at least one of the first elastic part and the second elastic part are a leaf spring.

4. The eyeglass-shaped frame according to claim 1, characterized in that at least one of the first elastic part and the second elastic part are formed from a plurality of rod-shaped members.

5. The eyeglass-shaped frame according to claim 4, characterized in that the plurality of rod-shaped members is twisted at a middle part, the first elastic part is arranged on a side where the front part is located when viewed from the middle part, and the second elastic part is arranged on a side where the ear hook part is located when viewed from the middle part.

* * * * *